United States Patent [19]
Wuidart

[11] Patent Number: 6,067,657
[45] Date of Patent: May 23, 2000

[54] CIRCUIT FOR THE DETECTION OF ANOMALIES OF ACCESS TO A CELL IN A MICROCONTROLLER

[75] Inventor: Sylvie Wuidart, Pourrieres, France

[73] Assignee: SGS-Thomson Microelectronics S.A., Gentilly, France

[21] Appl. No.: 09/108,060

[22] Filed: Jun. 30, 1998

[30] Foreign Application Priority Data

Jul. 3, 1997 [FR] France ................................. 97 08444

[51] Int. Cl.[7] .................................................. G06F 11/00
[52] U.S. Cl. .......................................... 714/811; 714/763
[58] Field of Search ..................... 714/763, 769, 714/811, 48

[56] References Cited

U.S. PATENT DOCUMENTS 5,568,135   10/1996   Shinozaki ................................. 714/811

FOREIGN PATENT DOCUMENTS

| 0 591 753 | 4/1994 | European Pat. Off. ........ G06F 11/00 |
| 0 762 279 | 3/1997 | European Pat. Off. ........ G06F 11/00 |
| 96/38789 | 12/1996 | WIPO ............................. G06F 11/00 |

*Primary Examiner*—Phung M. Chung
*Attorney, Agent, or Firm*—Theodore E. Galanthay; Allen, Dyer, Doppelt, Milbrath & Gilchrist, P.A.

[57] ABSTRACT

A detection circuit for a microcontroller includes a decoding circuit to decode the addressing codes of the memory to detect an addressing of the cell. The detection circuit also includes a circuit for decoding the instruction codes to detect the instructions comprising an access to the cell, and a logic circuit to give an alarm signal when an addressing of the cell is done in the absence of an instruction including an access to the cell.

16 Claims, 1 Drawing Sheet

CIRCUIT FOR THE DETECTION OF ANOMALIES OF ACCESS TO A CELL IN A MICROCONTROLLER

BACKGROUND OF THE INVENTION

The invention relates to microcontrollers, and, more particularly, in such microcontrollers, to a circuit used to detect anomalies of access to the memory part or cell in which information is saved for subsequent use.

BACKGROUND OF THE INVENTION

A microcontroller typically comprises a central processing unit that processes information elements or data elements stored in one or more memories according to programs or software also stored in these memories. The central processing unit and the memories are connected to one another by a plurality of conductors forming a communications bus in which circulate the codes of the data elements to be processed. Thus bus also carries the codes of the instructions identifying the operations to be performed on these data elements, and the codes for the addressing of the memory or memories.

During a processing operation, it is sometimes necessary to save certain states of the central processing unit, for example, to execute an interruption routine, and to restore these states after the interruption to continue the processing operation. These states are recorded or stored in a part of a random access type memory or RAM. This memory part is called a cell. In the event of an overflow of the cell or of an erroneous writing of the software, the program may malfunction or crash and lead the application to unpredictable results.

SUMMARY OF THE INVENTION

An object of the present invention, therefore, is to make a circuit and implement a method to detect erroneous access to the cell and generate an alarm if such access is detected.

Furthermore, it may happen, in the event of an error in the writing of the software, that information elements are stored in the part of the memory reserved for the cell, thereby leading to a malfunction. Accordingly, another object of the present invention, therefore, is to make a circuit to implement the method to detect an erroneous access to the cell and generate an alarm if such an access is detected.

Finally, another object of the present invention is a circuit and a method that prohibit the use of the microcontroller in the event of the detection of an anomaly of access to the cell.

The invention therefore relates to a circuit for the detection of an anomaly of access to the cell in a microcontroller comprising a central processing unit, at least one random-access memory, a part of which is reserved for the cell, an input/output circuit for the input and output of information elements, and a communications bus between the central processing unit, the input/output circuit and at least the memory. The circuit also preferably includes first means to detect any access to the cell, second means to detect any instruction comprising an access to the cell, and third means to generate an alarm signal when an access to the cell is detected outside the context of an instruction comprising such an access. According to the invention, the anomaly or alarm signal may be used to prohibit the operation of the microcontroller, for example, by inhibiting the output of the information elements in the input/output circuit.

According to the invention, the first means may comprise a circuit for decoding the random-access memory addressing codes and for giving or generating a first signal when the addressing code corresponds to an address in the cell. The second means may comprise a circuit for decoding the instruction codes and that gives a second signal when the instruction code corresponds to an instruction comprising an access to the cell. The third means may comprise a logic circuit that combines the first signal and the second signal to give an alarm signal when the first signal appears in the absence of the second signal.

The invention also relates to a method to detect an anomaly of access to the cell in a microcontroller comprising a central information-processing unit, at least one random-access memory, a part of which is reserved for the cell, an input/output circuit for the input and output of information, and a communications bus between the central processing unit, at least the memory and the input/output circuits. The method preferably comprises the steps of: generating a first signal in the event of the addressing of the cell, generating a second signal in the case of an instruction comprising an access to the cell, and generating an alarm signal when the first signal is present while the second signal is absent.

BRIEF DESCRIPTION OF THE DRAWING

The invention will be understood more clearly from the following description of a particular exemplary embodiment, the description being made with reference to the appended drawing, in which.

DETAILED DESCRIPTION OF THE PREFERRED EMBODIMENTS

Figure 1:
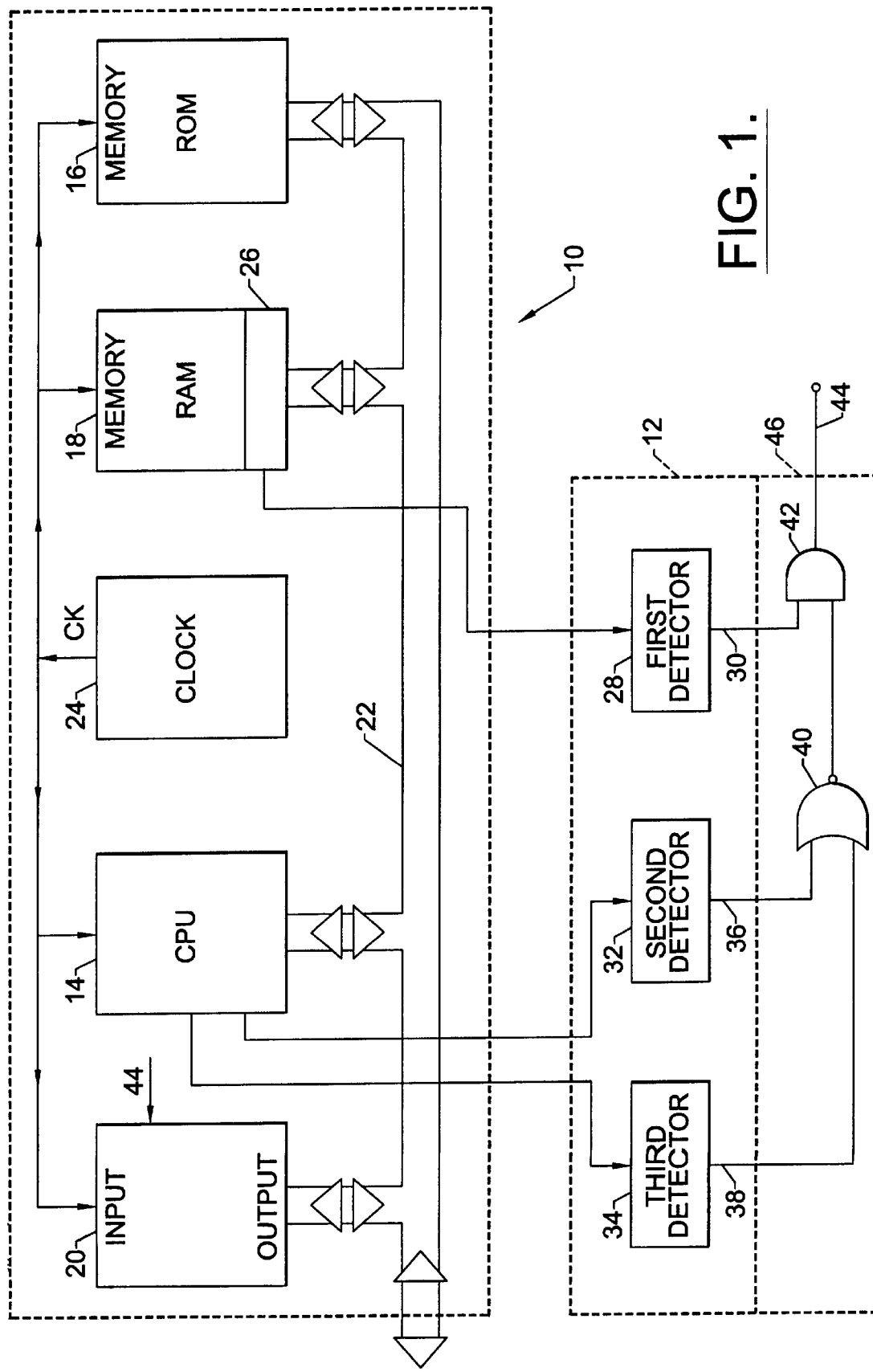
FIG. 1 is a simplified functional diagram of a microcontroller comprising a circuit according to the invention for the detection of anomalies of access to a cell.

The functional diagram of the sole drawing FIG. 1 illustrates a microcontroller 10 in which there is included a circuit 12 for the detection of anomalies of access to the cell according to the invention. The microcontroller 10 conventionally comprises: a central processing unit (CPU) 14, a first read-only memory 16 or ROM in which the instructions of the processing software programs are stored, a second random access type memory 18 or RAM in which there are recorded, in particular, data elements to be processed, and an input/output circuit 20 for the input and output of information elements. In addition, the microcontroller 10 includes a transmission circuit 22 or bus that connects the central processing unit 14, the memories 16 and 18 and the input/output circuit 20 to one another, and a clock circuit 24 that gives the different control signals CK to the central processing unit 14, the memories 16 and 18, the input/output circuit 20, and the bus 22.

A part labeled 26 of the RAM 18 is reserved for the storage of a number of information elements at certain points in time during the data-processing operation so as to save them for a period of time of variable length. This is so in the case of a routine for the interruption of the processing operation, a routine at the beginning of which the states of the central processing unit are saved in the part 26, or cell, of the memory 18 at specified addresses. These states are then restored in the central processing unit 14 at the end of the interruption routine to continue the interrupted processing operation.

To detect an anomaly of access to the cell 26 or a case of malfunctioning, the circuit 12 is designed to generate an alarm signal when an access to the zone or cell 26 is detected in the absence of an instruction containing such an access.

To this end, the circuit 12 has a first detector 28 to which there are applied the addressing codes of the memory 18, which gives a signal on the conductor 30 when it detects an addressing code corresponding to the cell 26.

To ascertain that this addressing code for the cell 26 corresponds to an instruction of the central processing unit 14 and not to an anomaly of access to the cell, the circuit 12 has second and third detectors, 32 and 34 respectively, to which the instruction codes coming from the central processing unit 14 are applied. These detectors 32 and 34 respectively give, on the conductors 36 and 38, a signal when they detect an instruction comprising an access to the cell 26. More specifically, the second detector 32 pertains to the instructions contained in the software, while the third detector 34 pertains to the detection of the interruption routine which, in principle, comprises an access to the cell at the beginning and end of the routine.

The conductors 36 and 38 are connected to the input terminals of a NOR logic circuit 40 whose output terminal is connected to one of the two input terminals of an AND logic circuit 42, the other input terminal of which is connected to the output conductor 30 of the detector 28. The output terminal 44 of the AND circuit 42 provides an alarm signal when an access to the cell is detected in the absence of an operation of access to the cell controlled by the central processing unit, whether it is an interruption routine or an instruction comprising an access to the cell. The circuits 40 and 42 provide a logic circuit 46 that combines the signals present at the conductors 30, 36 and 38.

The first detector 28 is a circuit for the decoding of the digits of the addressing code that characterize the zone reserved for the cell. The second detector 32 is a circuit for the decoding of the digits of the instruction codes that characterize the access to the cell, these codes being provided by the central processing unit. The third detector 34 is designed to recognize the PUSH/POP signals which respectively, during an interruption routine, represent the operation for saving the states at the beginning of the routine, and the operation for restoring the states at the end of a routine. These operations imply write access or read access to the cell 26.

The invention has been described in its application to the detection of an anomaly of access to the cell, but it can also be applied to the detection of a programming error in which the cell might be addressed in a write or read mode in the case of an instruction that does not include any access to the cell. The alarm signal would warn the programmer of his error.

In many applications, it is necessary to block a malfunction from having any unfortunate consequences. Therefore, according to the invention, the alarm signal will stop the operation of the microcontroller, for example, by placing the output terminals at ground potential through action on the input/output circuit 20.

The circuit that has just been described shows how the invention also contemplates a method whose steps include: generating a first signal in the case of the addressing of the cell, generating a second signal in the case of an instruction comprising an access to the cell, and generating a warning signal when the first signal is present while the second signal is absent. An additional step may be added and will include inhibiting or stopping the operation of the microcontroller should the alarm signal be present.

That which is claimed is:

1. A detection circuit for the detection of an anomaly of access to a cell in a microcontroller comprising a central processing unit, at least one random access memory including a part reserved for the cell, an input/output circuit, and a communications bus for the central processing unit, the input/output circuit, and the at least one random access memory, the detection circuit comprising:

first means for detecting an access to the cell;

second means for detecting an instruction comprising an access to the cell; and third means for generating an alarm signal when an access to the cell is detected outside a context of an instruction comprising such an access.

2. A detection circuit according to claim 1, further comprising fourth means for prohibiting the operation of the microcontroller responsive to an alarm signal.

3. A detection circuit according to claim 1, wherein said first means comprise a circuit for decoding random-access memory addressing codes and for generating a first signal when an addressing code corresponds to an address in the cell.

4. A detection circuit according to claim 3, wherein said second means comprise a circuit for decoding instruction codes and for generating a second signal when the instruction code corresponds to an instruction for access to the cell.

5. A detection circuit according to claim 4, wherein said third means comprise a logic circuit for generating an alarm signal when the first signal is present in the absence of the second signal.

6. A detection circuit for the detection of an anomaly of access to a cell in a microcontroller comprising a central processing unit, at least one random access memory including a part reserved for the cell, an input/output circuit, and a communications bus for the central processing unit, the input/output circuit, and the at least one random access memory, the detection circuit comprising:

a circuit for decoding random-access memory addressing codes and for generating a first signal when an addressing code corresponds to an address in the cell;

a circuit for decoding instruction codes and for generating a second signal when an instruction code corresponds to an instruction for access to the cell; and alarm means for generating an alarm signal responsive to the first signal being present in the absence of the second signal.

7. A detection circuit according to claim 6, further comprising means for prohibiting the operation of the microcontroller responsive to an alarm signal.

8. A detection circuit according to claim 6, wherein said alarm means comprise at least one logic circuit.

9. A microcontroller comprising:

a central processing unit;

at least one random access memory including a part reserved for a predetermined cell;

an input/output circuit;

a communications bus for the central processing unit, the input/output circuit and the at least one random access memory; and a detection circuit for the detection of an anomaly of access to the predetermined cell, said detection circuit comprising first means for detecting an access to the predetermined cell, second means for detecting an instruction comprising an access to the predetermined cell, and third means for generating an alarm signal when an access to the predetermined cell is detected outside a context of an instruction comprising such an access.

10. A microcontroller according to claim 9, further comprising fourth means for prohibiting the operation of the microcontroller responsive to an alarm signal.

11. A microcontroller according to claim 9, wherein said first means comprise a circuit for decoding random-access memory addressing codes and for generating a first signal when an addressing code corresponds to an address in the cell.

12. A microcontroller according to claim 11, wherein said second means comprise a circuit for decoding instruction codes and for generating a second signal when the instruction code corresponds to an instruction for access to the cell.

13. A microcontroller according to claim 12, wherein said third means comprise a logic circuit for generating an alarm signal when the first signal is present in the absence of the second signal.

14. A method to detect an anomaly of access to a cell in a microcontroller comprising a central processing unit, at least one random access memory, a part of which is reserved for the cell, an input/output circuit for the input and output of information, and a communications bus for the central processing unit, and the at least one random access memory, the method comprising the steps of:

generating a first signal responsive to addressing of the cell;

generating a second signal responsive to an instruction for access to the cell; and generating an alarm signal responsive to the first signal being present while the second signal is absent.

15. A method according to claim 14, further comprising the step of inhibiting operation of the microcontroller responsive to an alarm signal.

16. A method according to claim 14, wherein the step of generating an alarm signal comprises generating the alarm signal using at least one logic circuit coupled to the first and second signals.

* * * * *